United States Patent

Wilson

(10) Patent No.: US 9,063,885 B2
(45) Date of Patent: *Jun. 23, 2015

(54) MOBILE WIRELESS COMMUNICATIONS DEVICE WITH RESET FUNCTIONS AND RELATED METHODS

(71) Applicant: BLACKBERRY LIMITED, Waterloo (CA)

(72) Inventor: Matthew Iain Wilson, Ottawa (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/281,140

(22) Filed: May 19, 2014

(65) Prior Publication Data

US 2014/0256383 A1  Sep. 11, 2014

Related U.S. Application Data

(63) Continuation of application No. 12/551,932, filed on Sep. 1, 2009, now Pat. No. 8,743,128.

(51) Int. Cl.
*G06F 1/24* (2006.01)
*G06F 13/14* (2006.01)
*H04M 1/00* (2006.01)

(52) U.S. Cl.
CPC ............. *G06F 13/14* (2013.01); *G06F 1/24* (2013.01); *H04M 1/00* (2013.01)

(58) Field of Classification Search
CPC ..................................... G06T 1/20; G06F 1/24
See application file for complete search history.

(56) References Cited

U.S. PATENT DOCUMENTS

| 3,532,813 | A | 10/1970 | Lechner |
| 4,587,629 | A | 5/1986 | Dill et al. |
| 5,852,720 | A | 12/1998 | Gready et al. |
| 6,067,627 | A | 5/2000 | Reents |
| 6,101,600 | A | 8/2000 | Arnold et al. |
| 6,708,270 | B1 | 3/2004 | Mayer |
| 7,489,923 | B2 | 2/2009 | Varanda |
| 2001/0026259 | A1 | 10/2001 | McKnight |
| 2006/0007905 | A1 | 1/2006 | Yach et al. |
| 2006/0112263 | A1 | 5/2006 | Chu et al. |
| 2007/0024744 | A1 | 2/2007 | Kaehler et al. |
| 2007/0050685 | A1 | 3/2007 | Tsai et al. |

(Continued)

FOREIGN PATENT DOCUMENTS

| JP | 08227328 | 9/1996 |
| JP | 2000330669 | 11/2000 |
| JP | 2008041059 | 2/2008 |

OTHER PUBLICATIONS

Database WPI Week 199645, Thomson Scientific, London, GB; AN 1996-452304 XP002570207, 1 pg.

*Primary Examiner* — Kee M Tung
*Assistant Examiner* — Ryan D McCulley
(74) *Attorney, Agent, or Firm* — Guntin & Gust, PLC; Andrew Gust

(57) ABSTRACT

A mobile wireless communications device may include a display, a graphics processing unit (GPU) being resettable and causing a change in the display when reset, a wireless transceiver, and a processor cooperating with the GPU and the wireless transceiver for wireless communications. The processor may be resettable along with the GPU, and the processor also may be partially resettable without resetting the GPU to avoid a change in the display.

15 Claims, 4 Drawing Sheets

(56) References Cited

U.S. PATENT DOCUMENTS

| | | |
|---|---|---|
| 2007/0091080 A1 | 4/2007 | Ek et al. |
| 2007/0220358 A1 | 9/2007 | Goodill et al. |
| 2008/0040584 A1 | 2/2008 | Hansen et al. |
| 2008/0064339 A1 | 3/2008 | Cavalier |
| 2008/0189538 A1 | 8/2008 | King et al. |
| 2008/0313418 A1 | 12/2008 | Kwon et al. |
| 2010/0125723 A1 | 5/2010 | Cooper et al. |
| 2011/0143809 A1 | 6/2011 | Salomone et al. |

MOBILE WIRELESS COMMUNICATIONS DEVICE WITH RESET FUNCTIONS AND RELATED METHODS

TECHNICAL FIELD

The present disclosure relates to the field of wireless communications, and, more particularly, to a mobile wireless communications device and related methods.

BACKGROUND

Mobile communications devices, including but not limited to cell phones, have become an integral part of society over the last two decades. On occasion, a mobile communication device may suffer a serious software error (sometimes called a fatal software error), which can be resolved by a reset operation. In early devices, a user could typically accomplish this reset operation by removing the power supply, i.e. a "battery pull" procedure. To avoid the inconvenience of the battery pull procedure, some manufacturers provided a reset switch that provided similar functionality, and other manufacturers made the reset function accessible via a software command. A reset operation in which the entire system is reset is often called a "hard reset operation" or a "full reset operation."

The typical mobile communications device may include many integrated circuits (ICs) therein, for example, a processor such as a central processing unit (CPU), a power management circuit, and a graphics processing unit (GPU) driving a display for the device. Each of these ICs is supplied with power controlled by the power management circuit. When the device is reset, the power supplied to each of theses ICs is cycled off and on, thereby resetting all the ICs. Nonetheless, when these ICs are reset, the device may have a lengthy reboot time, thereby inconveniencing the user.

DETAILED DESCRIPTION OF THE EMBODIMENTS

Figure 1:
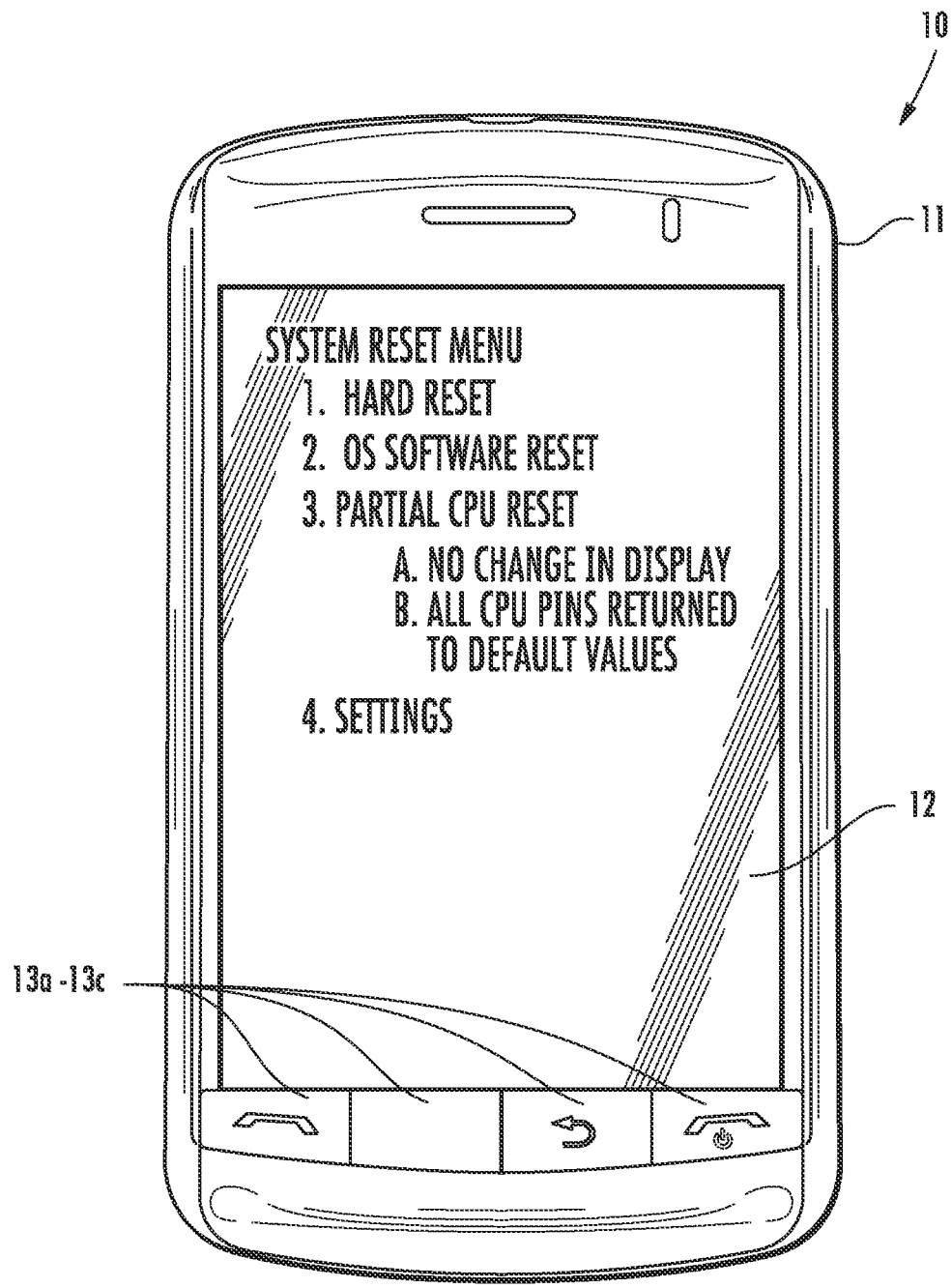
FIG. 1 is a front view of a mobile wireless communications device according to the present disclosure.

In some cases, a mobile wireless communications device does not need a hard/full reset. Rather than resetting all or most of the systems, perhaps a few subsystems may be reset. Perhaps, only the CPU needs to be reset, for example. In such cases, a partial reset (or fast reset) may be performed. Positively, the partial reset feature may provide a mobile wireless communications device reset that is shorter in duration than a hard/full reset. A potential drawback to the partial reset of the CPU may be that other subsystems that do not need to be reset are adversely affected. Resetting a CPU, for example, may cause all of the CPU output pins to return to their default values. A return to the defaults values typically includes resetting the GPU, thereby causing the display to be changed, for example, the display may flicker or blank out.

As described below, a processor, such as a CPU, may be resettable along with the GPU, and the processor also may be partially resettable without resetting the GPU. When the processor is reset without resetting the GPU, a change in the display of the device can be avoided. This concept will be described in the context of a mobile wireless communications device, which may include a display, and a graphics processing unit (GPU). The GPU is resettable and an undesirable change in the output of the display occurs, such as a flickering or a blanking, when the display is reset. The mobile wireless communications device also includes a wireless transceiver, and a processor cooperating with the GPU and the wireless transceiver for wireless communications. The processor may be resettable along with the GPU, and the processor also may be partially resettable without resetting the GPU to avoid a change in the display.

The mobile wireless communications device may further include a power management circuit for shutting down power to the GPU and the processor during resets thereof, but maintaining power to the GPU and the processor during a partial reset of the processor. The processor may have an output generating a GPU reset signal during the partial reset of the processor. The power management circuit may have an output generating a GPU reset hold signal. The mobile wireless communications device may further comprise a logic circuit receiving as inputs the GPU reset signal and the GPU reset hold signal and outputting a reset control signal to the GPU.

In some embodiments, the logic circuit may comprise an OR gate. The mobile wireless communications device may further comprise a rechargeable power supply coupled to the display, the GPU, the wireless transceiver, and the processor, and a housing carrying the display, the GPU, the wireless transceiver, and the processor. For example, the display may comprise a liquid crystal display, and the wireless transceiver may comprise a wireless cellular telephone transceiver.

Another aspect is directed to a method for making a mobile wireless communications device. The method may include coupling a GPU to a display, the GPU being resettable and causing a change in the display when reset, and coupling a processor to the GPU and a wireless transceiver for wireless communications. The processor may be resettable along with the GPU, and the processor also may be partially resettable without resetting the GPU to avoid a change in the display.

Another aspect is directed to a method of operating a mobile wireless communications device including a display, a graphics processing unit (GPU) being resettable and causing a change in the display when reset, a wireless transceiver, and a processor cooperating with the GPU and the wireless transceiver for wireless communications and being resettable along with the GPU. The method may include partially resetting the processor without resetting the GPU to avoid a change in the display.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements in alternative embodiments.

Figure 2:
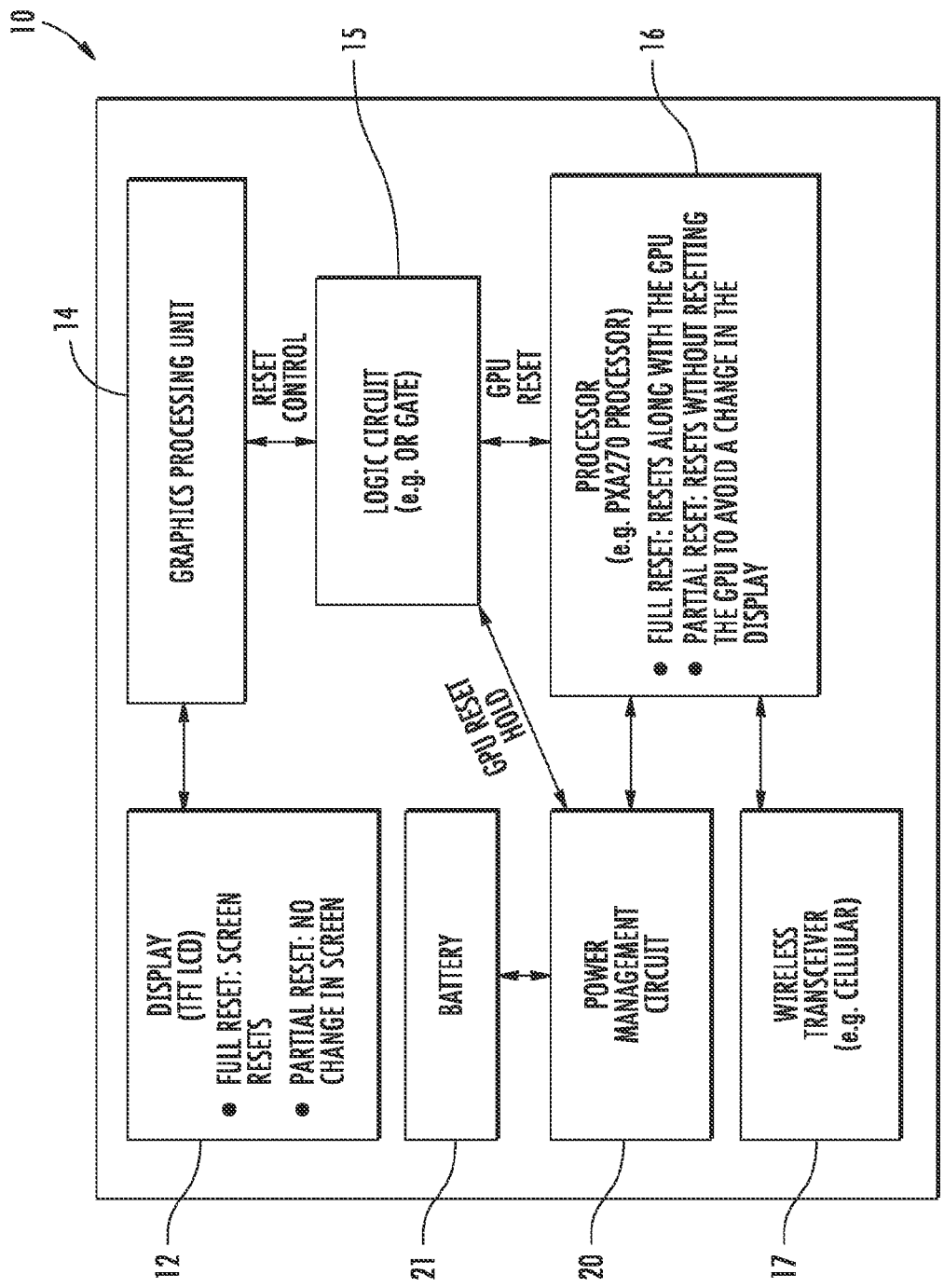
FIG. 2 is a schematic block diagram of the mobile wireless communications device of FIG. 1.

Referring initially to FIGS. 1-2, a mobile wireless communications device 10 illustratively includes a display 12, and a graphics processing unit (GPU) 14 cooperating therewith to provide a graphical user interface to a user. The display 12 may comprise, for example, a transmissive thin film transistor liquid crystal display (LCD). The mobile wireless communications device 10 illustratively includes a processor 16, and a wireless transceiver 17 coupled thereto. The processor 16 may comprise, for example, a Marvell Tavor PV processor, as available from Marvell Semiconductor, Inc. of Santa Clara, Calif. In certain embodiments, the wireless transceiver 17 may comprise a cellular transceiver, for example, a Global System for Mobile communications (GSM), a code division multiple access (CDMA) transceiver, and/or a Universal Mobile Telecommunications System Wideband Code Division Multiple Access (UMTS W-CDMA).

The mobile wireless communications device 10 illustratively includes a power management circuit 20 coupled to the processor 16, and a rechargeable power source, illustrated as a battery 21. The battery 21 is illustratively coupled to the power management circuit 20, the GPU 14, the display 12, the wireless transceiver 17, and the processor 16. Also, the mobile wireless communication device 10 illustratively includes a housing 11 carrying the display 12, the GPU 14, the wireless transceiver 17, the battery 21, the power management circuit 20, and the processor 16. The mobile wireless communications device 10 illustratively includes a plurality of switches 13a-13c affixed to an outer surface of the housing 11.

Further, the mobile wireless communications device 10 further illustratively includes a logic circuit 15 coupled between the processor 16 and the GPU 14, and between the power management circuit 20 and the GPU. As will be appreciated by those skilled in the art, the mobile wireless communications device 10 includes a plurality of power lines (power rails) providing power to each of the integrated circuits (ICs).

During operation, the processor 16 cooperates with the GPU 14 and the wireless transceiver 17 for wireless communications and other mobile wireless functions, for example, GPS navigation and Internet applications. Also, as may be desirable during certain operations, the processor 16 may reset the GPU 14, thereby causing a change in the display 12 when reset, i.e. a flickering or blanking of the display. The processor 16 is resettable along with the GPU 14. More particularly, during a hard/full reset procedure, the power management circuit 20 may disable the power lines to all IC circuits, causing each IC circuit to reset, i.e. the power management circuit shuts down power to the GPU 14 and the processor 16 during resets thereof.

Advantageously, the processor 16 also may be partially resettable without resetting the GPU 14. In other words, the processor 16 may access a command to reset itself without disruption of power supply from the power management circuit 20 to any of the other IC circuits. In some embodiments, the processor 16 may access a command to reset itself automatically without a command from the user. Further to this point, during the partial reset operation of the processor 16, the power management circuit 20 maintains power to the GPU 14 and the processor 16. Nonetheless, during the partial reset operation of the processor 6, the processor returns all pin outputs to default values. For example, the GPU reset output pin would return to a default low value, which in the typical device would reset the GPU and display and may be described as high or low, but this is for convenience of explanation, and the concepts described herein are not necessarily limited to particular logical values.

In this mobile wireless communications device 10, the GPU reset signal received from the GPU reset output pin of the processor 16 is fed into the logic circuit 15. The power management circuit 20 illustratively provides a GPU reset hold signal, which is also input in the logic circuit 15. The output of the logic circuit 15 is coupled to a reset pin of the GPU 14 and provides a reset control signal. Advantageously, during the partial reset operation of the processor 16, the logic circuit 15 maintains the output to a high value even though the GPU reset signal from the processor goes to a low value, thereby preventing the GPU 14 and display 12 from resetting, i.e. this avoids any flickering or blanking of the display during the partial reset.

In some embodiments, the logic circuit 15 may comprise an OR gate. More particularly, the OR gate may receive the GPU reset signal from the processor 16 and the GPU reset hold signal from the power management circuit 20. During the partial reset operation, the processor 16 GPU reset signal goes to a low value and is OR'ed with the GPU reset hold signal of the power management circuit 20, for example, the power management IC General Purpose Input/Output (PMIC GPIO) signal. During the partial reset, the power management circuit 20 PMIC GPIO signal remains at a high value and keeps the output of the OR gate, i.e. the reset control signal, also at a high value, thereby preventing the GPU 14 and display 12 from resetting and disrupting the user experience. Indeed, in the mobile wireless communications device 10, the processor 16 may perform a partial reset without the user even noticing.

Figure 3:
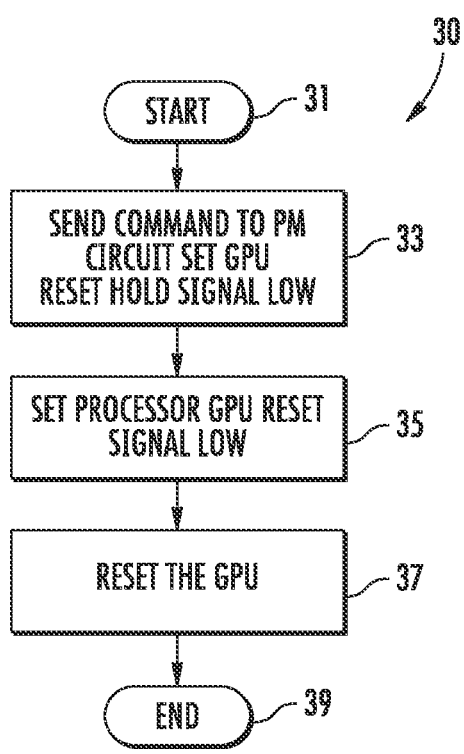
FIG. 3 is a flowchart illustrating operation of the mobile wireless communications device of FIG. 1.

Referring now additionally to the flowchart 30 of FIG. 3, in situations where it may be desirable to force a GPU 14 and display 12 reset, the processor 16 begins at Block 31 and sends the power management circuit 20 a command to bring the GPU reset hold signal to a low value. (Block 33). As will be appreciated by those skilled in the art, the processor 16 and the power management circuit 20 communicate using a multi-master serial computer bus based upon, for example, an inter-integrated circuit ($I^2C$) standard. Of course, as will be appreciated by those skilled in the art, other communication standards may be used. The processor 16 sets the GPU reset signal to a low value, which now brings the reset control signal to a low value also, thereby resetting the GPU 14 and the display 12. (Blocks 35, 37, & 39).

Figure 4:
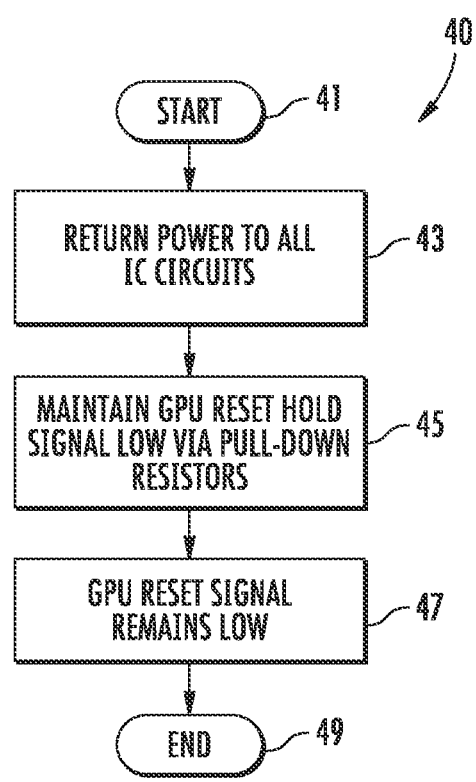
FIG. 4 is another flowchart illustrating operation of the mobile wireless communications device of FIG. 1.

Referring now additionally to the flowchart 40 of FIG. 4, in this embodiment, the mobile wireless communications device 10 may include a pair of pull-down resistors (for example, 300 kΩ) coupled to the OR gate. In particular, one pull-down resistor (FIG. 5) is coupled to PMIC GPIO signal and the other pull-down resistor is coupled to the output of the OR gate. Advantageously, this maintains the reset control signal at a low value during a power-up operation of the mobile wireless communications device 10. More specifically, as will be appreciated by those skilled in the art, it is desirable to maintain the display 12 in a reset state during the power-up operation, which begins at Block 41. At power-up, (Block 43), the PMIC GPIO signal is by default in an unconfigured state and the processor 16 GPU reset signal goes to a low value by default. Accordingly, the first pull-down resistor maintains the respective input of the OR gate at a low value, therefore keeping the reset control signal low during the power-up operation. (Block 45).

Furthermore, the second pull-down resistor (FIG. 5) coupled to the output of the OR gate is used to maintain the output at a low value during the power-up operation. More particularly, the time period of concern is prior to 1.8 Volt power application to the OR gate. In other words, the second pull-down resistor keeps the OR gate output at a low value when the OR gate is not powered. (Blocks 47 & 49). Of course, if the OR gate can maintain a low while being without power, then the second pull-down resistor may be omitted.

Figure 5:
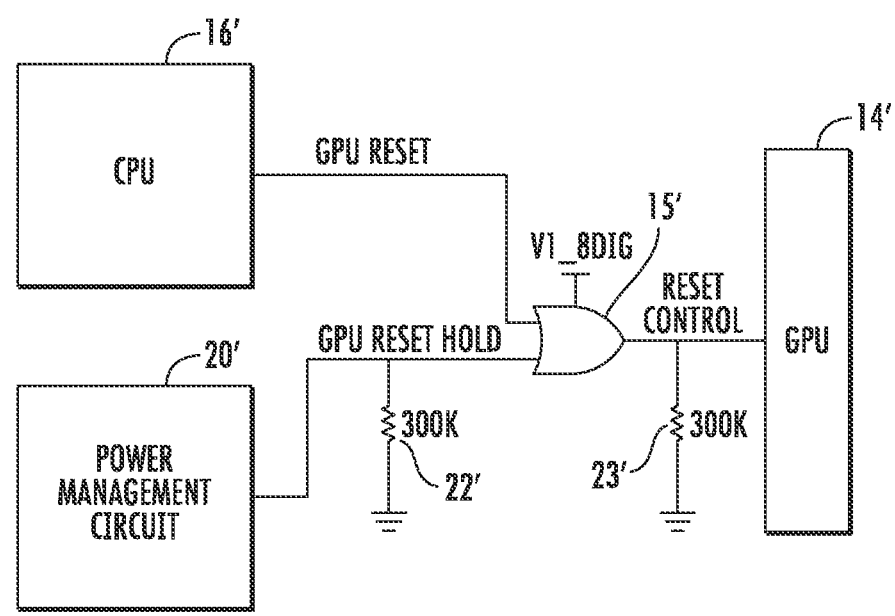
FIG. 5 is a schematic circuit diagram of a portion of the mobile wireless communications device of FIG. 1.

Referring now to FIG. 5, another embodiment of the mobile wireless communications device 10' is now described. In this embodiment of the mobile wireless communications device 10', those elements already discussed above with respect to FIGS. 1-2 are given prime notation and most require no further discussion herein. This embodiment differs from the previous embodiment in that the mobile wireless communications device 10' further includes an OR gate 15' receiving the GPU reset and the GPU reset hold signals and outputting the reset control signal to the GPU. Further, as discussed herein above, the mobile wireless communications device 10' further includes a pair of pull-down resistors 22'-23'.

Another aspect is directed to a method for making a mobile wireless communications device 10. The method may include coupling a GPU 14 to a display 12, the GPU being resettable and causing a change in the display when reset, and coupling a processor 16 to the GPU and a wireless transceiver 17 for wireless communications. The processor 16 may be resettable along with the GPU 14, and the processor also may be partially resettable without resetting the GPU to avoid a change in the display 12.

The mobile wireless communications device 10 described hereinabove may provide several benefits over the typical mobile wireless communications device. For example, mobile wireless communications device 10 experiences shorter reboot times and provides a more desirable user experience during a partial reset operation since the display 12 does not flicker or reset during aforesaid partial reset operations. Indeed, the user may be unaware that the mobile wireless communications device 10 has performed a fast reset operation.

Many modifications and other embodiments of the disclosure will come to the mind of one skilled in the art having the benefit of the teachings presented in the foregoing descriptions and the associated drawings. Therefore, it is understood that this disclosure is not to be limited to the specific embodiments disclosed, and that modifications and embodiments are intended to be included within the scope of the appended claims.

That which is claimed is:

1. An electronic device comprising:
    a display;
    a graphics processing unit (GPU) configured to be resettable and cause a change in said display when reset;
    a processor configured to
        be resettable along with said GPU,
        be partially resettable without resetting said GPU to avoid a change in said display, and
        generate a GPU reset signal during the partial reset;
    a power management circuit configured to shut down power to said GPU and said processor during resets thereof, but maintain power to said GPU and said processor during a partial reset, and to generate a GPU reset hold signal; and
    a logic circuit configured to reset said GPU during the reset of said processor, and not reset said GPU during the partial reset based upon the GPU reset signal and the GPU reset hold signal.

2. The electronic device according to claim 1 wherein said processor is configured to be partially resettable based upon a self-initiated command.

3. The electronic device according to claim 1 further comprising a wireless transceiver coupled to said processor.

4. The electronic device according to claim 3 wherein said wireless transceiver comprises a wireless cellular telephone transceiver.

5. The electronic device according to claim 1 wherein said logic circuit comprises an OR gate.

6. The electronic device according to claim 1 further comprising a rechargeable power supply coupled to said display, said GPU, and said processor.

7. The electronic device according to claim 1 wherein said display comprises a liquid crystal display.

8. An electronic device comprising:
    a display;
    a graphics processing unit (GPU) configured to be resettable and cause a change in said display when reset;
    a processor configured to
        be resettable along with said GPU,
        be partially resettable without resetting said GPU to avoid a change in said display, and
        generate a GPU reset signal during the partial reset;
    circuitry coupled to said processor and said GPU and configured to
        shut down power to said GPU and said processor during resets thereof, but maintain power to said GPU and said processor during a partial reset, and to generate a GPU reset hold signal, and
        reset said GPU during the reset of said processor, and not reset said GPU during the partial reset based upon the GPU reset signal and the GPU reset hold signal.

9. The electronic device according to claim 8 wherein said processor is configured to be partially resettable based upon a self-initiated command.

10. The electronic device according to claim 8 further comprising a wireless transceiver coupled to said processor.

11. The electronic device according to claim 8 further comprising a rechargeable power supply coupled to said display, said GPU, and said processor.

12. The electronic device according to claim 8 wherein said display comprises a liquid crystal display.

13. A method of operating an electronic device including a display, a graphics processing unit (GPU) being resettable and causing a change in the display when reset, and a processor configured to be resettable along with the GPU, be partially resettable without resetting the GPU to avoid a change in the display, and generate a GPU reset signal during the partial reset, the method comprising:
    shutting down power to the GPU and the processor during resets thereof, but maintaining power to the GPU and the processor during a partial reset, and generating a GPU reset hold signal; and
    resetting the GPU during the reset of the processor, and not reset the GPU during the partial reset based upon the GPU reset signal and the GPU reset hold signal.

14. The method according to claim 13 wherein partially resetting the processor is based upon a self-initiated command.

15. The method according to claim 13 wherein the electronic device further comprises a wireless transceiver coupled to the processor, and further comprising operating the wireless transceiver.

* * * * *